United States Patent [19]

Solow et al.

[11] Patent Number: 4,949,561
[45] Date of Patent: Aug. 21, 1990

[54] STEERING WHEEL LOCK BAR

[75] Inventors: Joseph E. Solow; Stanley E. Solow, both of Plainview, N.Y.

[73] Assignee: Wolo Manufacturing Corporation, Deer Park, N.Y.

[21] Appl. No.: 335,217

[22] Filed: Apr. 7, 1989

[51] Int. Cl.⁵ .............................................. B60R 25/02
[52] U.S. Cl. ......................................... 70/209; 70/226
[58] Field of Search ................ 70/209, 207, 210, 211, 70/212, 213, 214, 226, 225

[56] References Cited

U.S. PATENT DOCUMENTS 3,462,982  8/1969  Moore .................................. 70/209

FOREIGN PATENT DOCUMENTS 1944299  6/1971  Fed. Rep. of Germany ........ 70/212
1127524  9/1968  United Kingdom .................. 70/209
2110175  6/1983  United Kingdom .................. 70/226

Primary Examiner—Robert L. Wolfe
Attorney, Agent, or Firm—Brumbaugh, Graves, Donohue & Raymond

[57] ABSTRACT

A device for securing the steering wheel of a vehicle has a lock housing with an axial bore for receiving a telescoping rod. A pair of legs extend from the housing at an acute angle relative to the axis and to one another. The rod extends from the bore in the opposite direction, and hook members are formed on each leg and the rod for engaging opposite sides of the steering wheel. The hook member on the rod, which is preferably an open, fan shaped jaw, is spaced a distance from the outer end of the rod, so that when the device is mounted on the steering wheel, the rod projects outwardly from the steering wheel and inhibits it from being turned.

9 Claims, 3 Drawing Sheets

STEERING WHEEL LOCK BAR

FIELD OF THE INVENTION

The present invention relates to automobile security devices, and in particular to devices of the type that attach to a steering wheel of the car to prevent the steering wheel from being freely rotated.

BACKGROUND OF THE INVENTION

Denmark patent No. 106,072 discloses an automobile steering lock bar, in which a pair of telescoping hook members may selectively be attached to opposite sides of a steering wheel. When the device is mounted and locked on the steering wheel, a bar projects outwardly from the steering wheel rim, and thereby limits the angle about which the steering wheel can be rotated. This effectively prevents the car from being driven with the bar in place.

In the 1970's, automobile security devices were introduced that lock the steering wheel to the floor brake pedal. Such devices employ a stationary lock housing which supports one hook member, and a serrated, telescoping rod which supports another hook member. With the lock released, the bar can be freely extended from the lock housing and the two hooks can thus be moved toward and away from one another. To mount the device, the hooks are positioned adjacent the steering wheel rim and brake pedal, and then pushed toward one another until they engage the steering wheel and brake pedal, respectively. Thereafter, the lock cylinder is turned to lock the rod in place.

Commonly owned U.S. Pat. No. 4,747,279 discloses a steering wheel mounted lock bar, similar to that disclosed in the Danish patent, except that the known serrated rod-telescoping lock assembly is utilized to carry the respective hook members. As in the case of the Danish patent, a bar projects from the steering wheel, when the device is mounted, to prevent the car from being driven. For further protection, one of the hook members is in the form of a lockable jaw mechanism, which locks around the rim on one side of the steering wheel, and thus renders the device more difficult even for a determined car thief to remove from the steering wheel. The assignee of the present invention markets this device under the trademark WB-40.

SUMMARY OF THE INVENTION

The present invention is a steering wheel lock bar that, when mounted, projects from the steering wheel so as to limit its rotation. At the same time, the present invention is difficult to remove from the steering wheel, even without the use of a lockable jaw mechanism.

More particularly, the invention is a device for securing the steering wheel of a vehicle which includes a lock housing having an axial bore therethrough, and a pair of legs extending from the housing at an acute angle relative to the bore axis and to one another. A hardened steel, telescoping rod extends axially from the bore in the direction opposite to the legs, and the housing includes a lock for engaging the rod at spaced axially locations for locking the rod at a desired positions. A pair of outwardly facing hooks or other engagement means are fixed on the legs, for engaging one side of the steering wheel at spaced locations. A hooking member, preferably formed as an outwardly facing, fan shape open jaw, is secured on the telescoping rod for engaging the opposite side of the steering wheel. The jaw is located a distance away from the end of the rod so that, when the device is mounted on the steering wheel, the end of the rod projects outwardly from the steering wheel rim and limits the angle about which the steering can be turned.

Preferably, the fan shape jaw is V-shaped, with jaw halves that converge toward a base saddle, which has a slight curvature to follow the steering wheel. Preferably, also, the saddle has a dimension slightly smaller than the steering wheel rim so that the steering wheel urges the jaw halves apart to ensure a snug engagement with the steering wheel.

For better understanding of the invention, reference is made to the following detailed description of the preferred embodiments, taken in conjunction with the drawings accompanying the application.

DETAILED DESCRIPTION OF THE PREFERRED EMBODIMENTS

Figure 1:
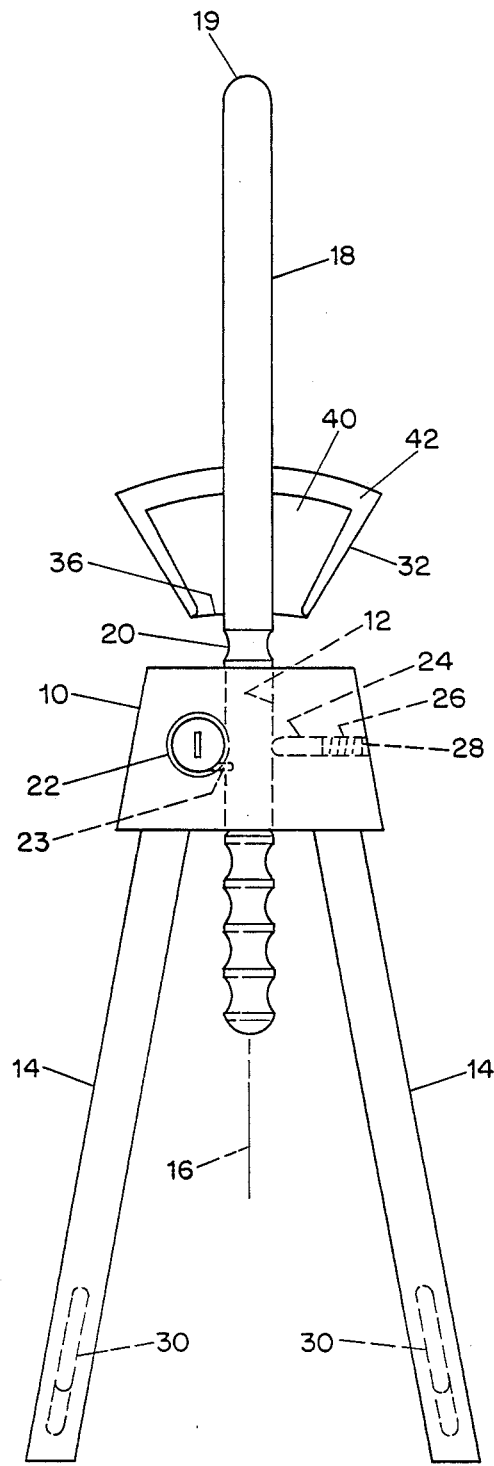
FIG. 1 is a front view of a steering wheel locking device according to the invention.

The device of FIGS. 1-5 includes a lock housing 10 with an axial bore 12 formed therethrough. A pair of legs 14 extend from the housing 10 at an acute angle relative to the bore axis 16 and relative to one another. Preferably, the legs project at an angle of about 25° relative to one another.

A telescoping rod 18, which is preferably made of hardened steel, projects from the central bore 12 in the direction generally opposite to the legs 14. As shown, the rod 18 includes a serrated portion 20 which is disposed in the housing 10. The housing 10, in turn, includes a rotatably lock mechanism 22 that includes a lock pin, bar or other member 23 that can be moved by the lock cylinder 22 perpendicular to the axis 16, into and out of the bore 12, to selectively engage the grooves of the serrations 20 for locking the rod in place. A pin 24 having a rounded end portion extends partially into the bore 12 from the direction opposite to the lock plate 22. The pin is biased by spring 26 toward the serrations with sufficient force to hold the rod against unwanted movement due to its own weight, but to allow the rod to be extended or retracted when movement is desired. Spring 26, in turn, is held in place by an end cap 28.

The lock mechanism 22, the lock plate 23, and a spring loaded detent mechanism 24, 26, of this generally type, which are used in conjunction with a serrated, telescoping rod, are themselves known and have been used in the United States and other countries since the 1970's in the aforedescribed brake pedal locks. Since these mechanisms are well known, further description is not required.

An outwardly facing hook member 30 is secured to each of the legs 14 and an outwardly facing (i.e. facing in the direction opposite to the hooks 30) fan shape, open jaw 32 is secured to the projecting rod 18 at a distance from the rod distal end 19.

Preferably, the jaw 32 is formed with converging jaw halves 34 that meet in a base saddle portion 36 which has a slight curvature to follow the curvature of the steering wheel. Preferably, the saddle portion has a width slightly smaller than a standard steering wheel 38, which is shown in phantom in FIG. 2, so that when the jaw 32 is pushed into engagement with the steering wheel the opposed jaw halves 40, 42 contact the steering wheel and are urged apart. The resulting compressive spring force of the jaw halves allows the device to fit very snugly on the steering wheel, and also takes up any longitudinal play between the serrations of the rod.

Figure 2:
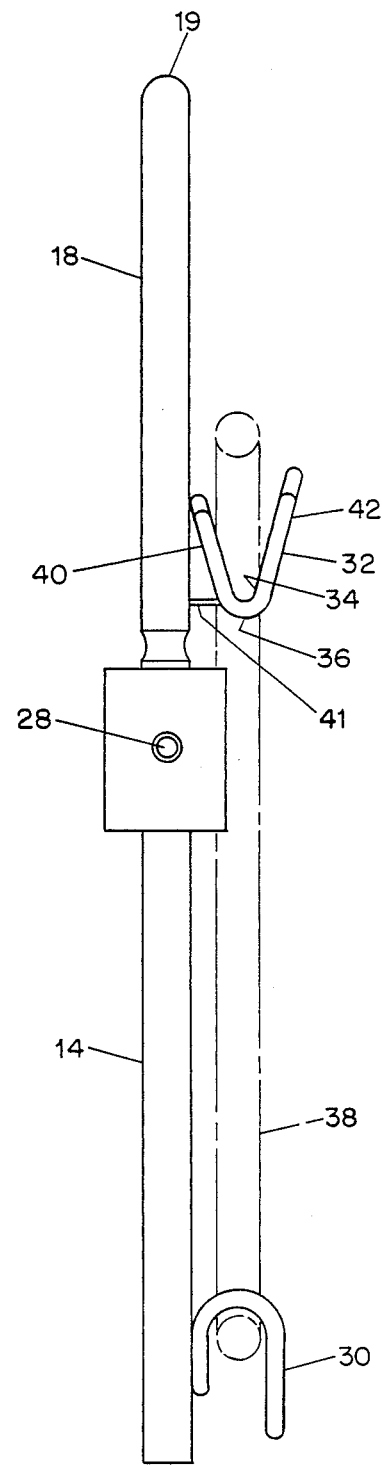
FIG. 2 is a side view of the device of FIG. 1, with a steering wheel section shown in phantom.
Figure 3:
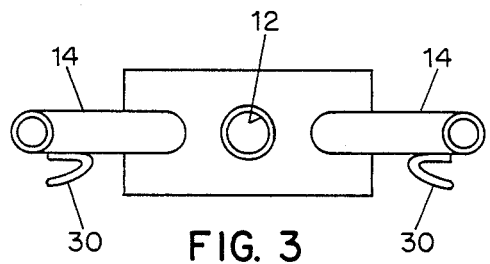
FIG. 3 is a bottom view of the device of FIG. 1.
Figure 4:
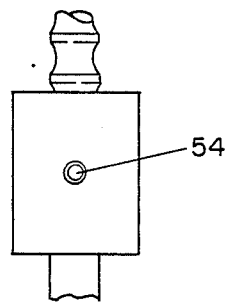
FIG. 4 is a side view, from the direction opposite of FIG. 2, of a of the device of FIG. 1.

The hook members 30 may be secured to the legs 14 by welding or any other suitable manner. As shown in FIG. 2, preferably the fan shape jaw 32 is secured such that the base saddle portion 36 is spaced outwardly from the rod. In an exemplary embodiment, the jaw member 32 is initially stamped flat, and a tongue 44 is pushed out to form spacer member for the bottom. Thereafter, the member 32 is bent to the V shape shown in FIGS. 1-2. The upper end of the inner jaw half 40 and tongue 44 are welded or otherwise secured to the rod, so that the inner jaw half 40 extends downwardly away from the rod.

In one preferred embodiment, the housing 10 is formed as a solid casting with the upper ends of the legs 14 joined in situ. This may be done by providing mold members that define, as shown best in FIG. 5, a bore 50 for the lock plug 22; a transverse bore 52 for a pin 54 to secure the lock plug 22 in a known manner; another transverse bore 54, opposite the lock bore 50, for receiving the detent pin 24, spring 26, and plug 28; and finally the main axial bore 12. If desired, the central bore 12 may be formed by positioning a sleeve 56, having cutouts 58, 60, for the lock plate 23 and pin 24, respectively, in the mold prior to casting. However, if desired the bore 12 may be formed using a retractable mold member. Alternatively, some or all of the bores can be made by drilling, or a multi-piece or hollow housing may be used.

Figure 5:
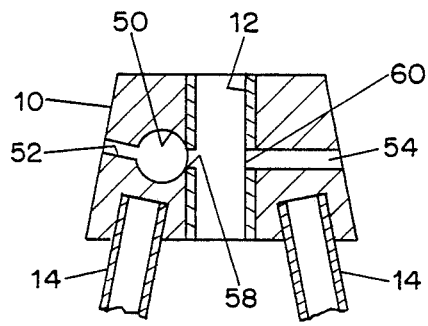
FIG. 5 is sectional view of the lock housing and leg members of the FIG. 1 device.

As shown in FIG. 5, the arms 14 are preferably tubular rather than solid. The upper ends of the arms 14 are inserted into the mold prior to casting and the housing 10 is thereafter formed by injecting a molten steel, which flows around and into the ends of the legs 14 to secure them to the housing. Other housings, however, and other means for securing the legs, may be utilized.

Figure 6:
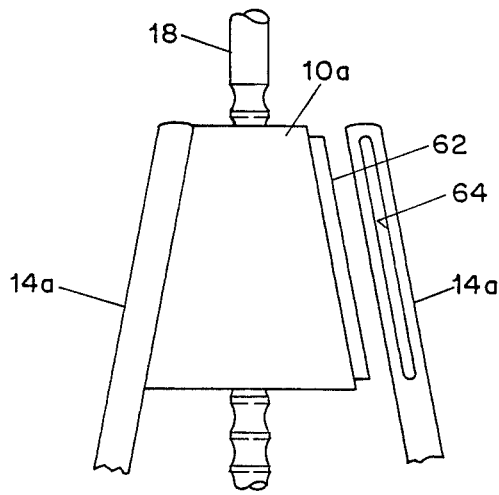
FIG. 6 is a front view of a second embodiment of a lock housing and leg members.

FIG. 6 shows an alternative housing 10a for receiving telescoping rod 18. In accordance with this embodiment, the legs 14a are not secured to the housing 10a in situ. Rather, an edge flange 62 is formed along opposite tapered side edges of the housing member 10a, and the upper ends of the legs 14a are each provided with a mating slot 64. The legs 14a are secured to the housing 10a by fitting the projections 62 into the respective slots 64, with the legs 14a extending so as to diverge from one another, and welding the members together. The sides of the housing 10a, as shown, taper so that the legs 14a diverge at a relative angle of about 25°. The housing 10a in other respects may be similar to that shown and described in connection with FIGS. 1-5.

Figure 7:
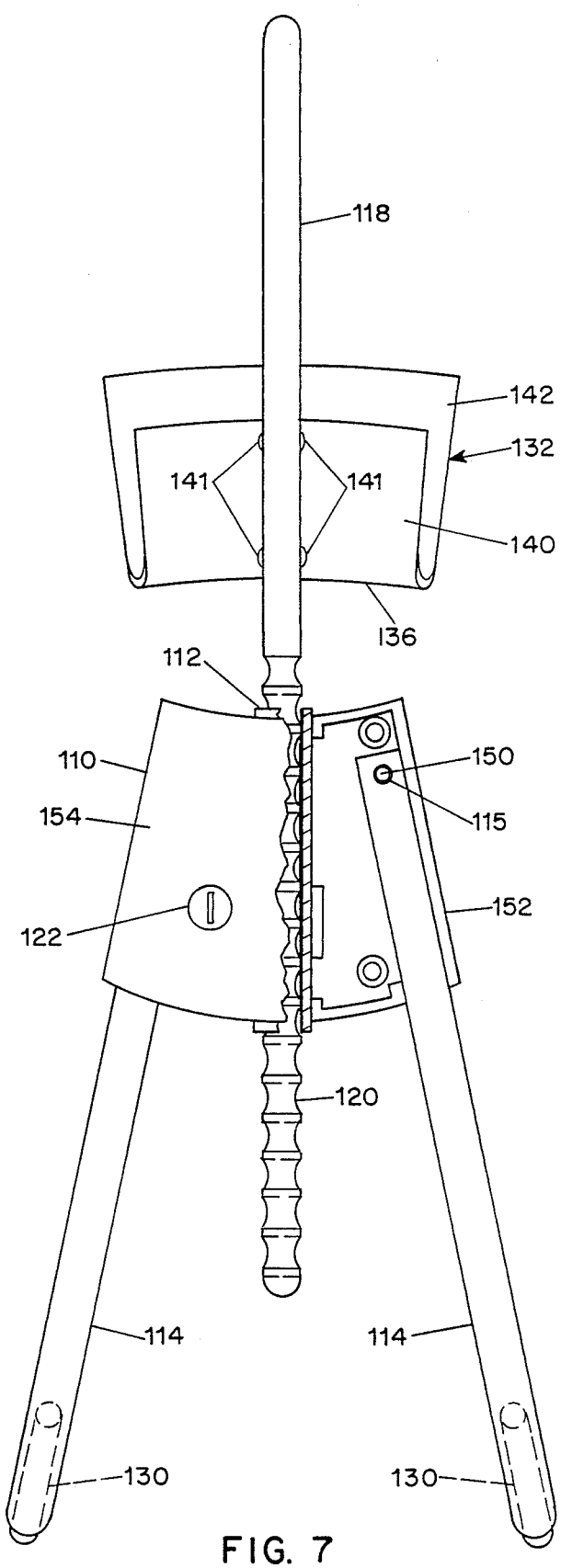
FIG. 7 is a front view of a third embodiment of a steering wheel both according to the invention.
Figure 8:
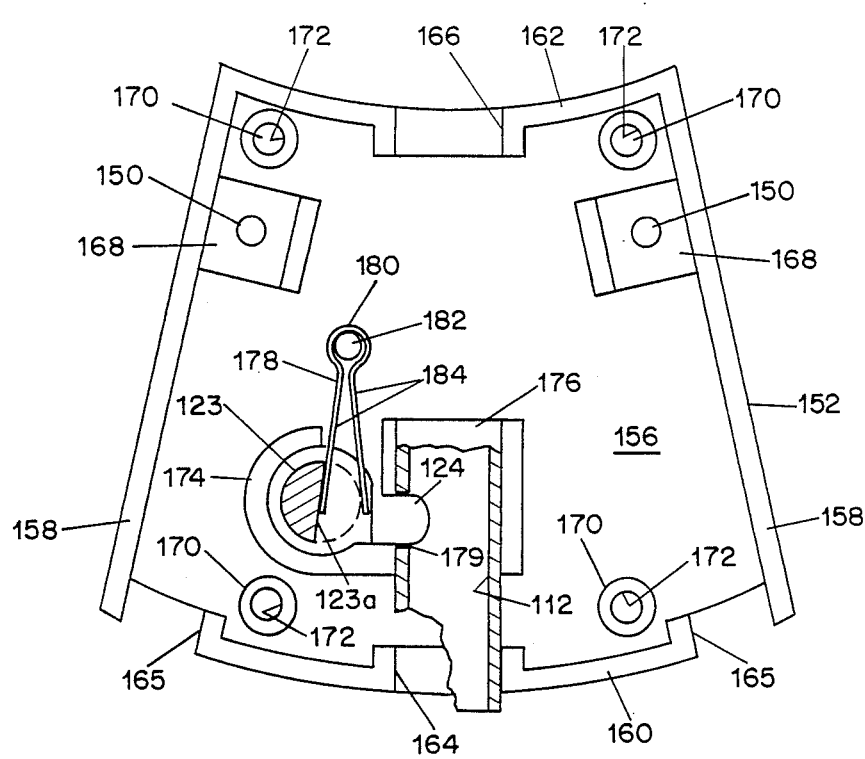
FIG. 8 is a front view, on an enlarged scale, of the bottom half of the lock housing of FIGS. 7.
Figure 9:
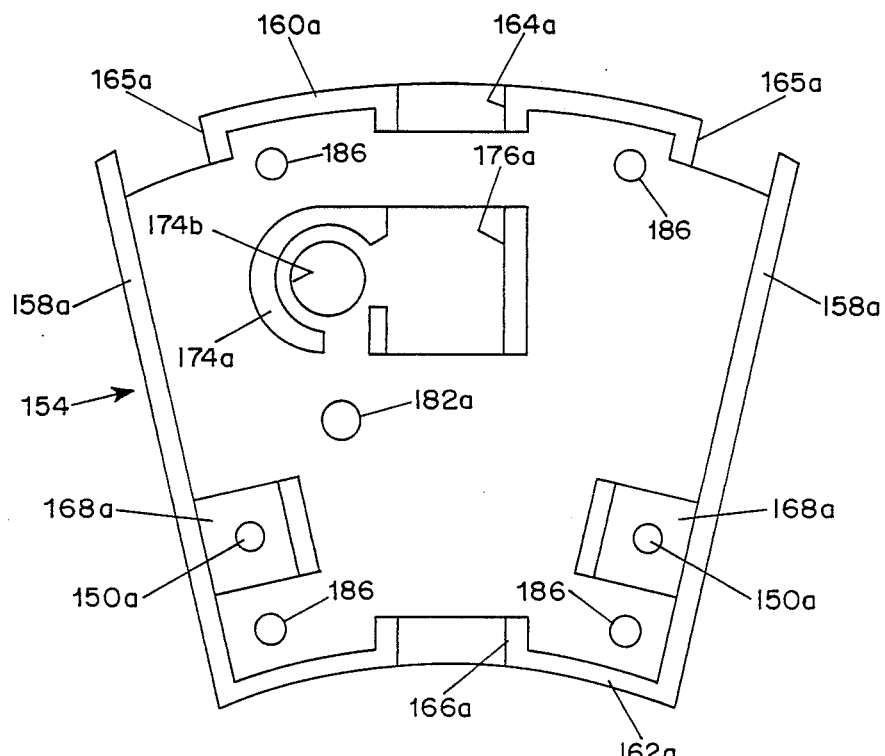
FIG. 9 is a back view, on an enlarged scale, of the upper half of the lock housing of FIG. 7.

FIGS. 7-9 show an alternative embodiment of a steering wheel lock bar including a lock housing 110 with a bore, formed by tube 112, therethrough, a pair of legs 114 diverging at an acute angle relative to the bore axis and one another, and a telescoping rod 118 having a serrated portion 120 disposed in the bore 112 and extending out of the bore in the direction opposite to the legs 114. A U-shaped jaw element 132 is secured on the rod, with an inner jaw half 140 welded, as shown in 141, flush to the rod, a saddle portion 136, and an outer jaw half 142 spaced outwardly from the rod 118. A pair of hooks 130 are secured to the ends of legs 114, the open side of hooks 130 and jaw 132 facing in opposite directions. The upper end of the legs 114 include a hole 115, for receiving anchor pins 150 and 150a (FIG. 9) formed on the housing, as described below. Finally, the rod 118 is selectively locked in place by a lock 122. The housing 110 is formed as a pair of lower and upper die cast housing members 152, 154, respectively, which are shown on an enlarged scale in FIGS. 8 and 9.

The lower housing member 152 includes a bottom plate 156, a pair of upstanding sides 158, and upstanding end ridges 160, 162. The lower end ridge 160 includes half cylinder guides 164, 165 for the central bore tube 112 and legs 114. The upper end ridge 162 is formed with one half cylinder guide 166, for the bore tube 112. A pair of half cylinder guides 168 are disposed inside the member 152 and aligned with guides 165 for supporting the upper end of the legs 114. As noted above, the leg guides 168 include upright anchor pins 150, that extend into the holes 115 in the legs 114. Lower housing member 152 also includes bosses 170 with holes 172 for receiving rivets (described below) for securing the two halves of the housing. Preferably the bottom of the holes 172 are recessed from the outside surface of plate 156.

Lock 122 is secured in an internal boss 174. FIG. 8 shows the bottom of rotatable cylinder 123 of lock 122, which includes a flat portion 123a. A detent 124 is moveably held in a half cylinder guide 176, aligned with guides 164, 166, by a spring pin 178 so as to project into the central bore tube 112, a portion of which is shown, bore tube 112 being provided with a suitable cutout 179. Spring pin 178, in turn, has a base 180 held about an anchor pin 182, and a pair of spring legs 184 engaging, respectively, the lock cylinder 123 and the detent 124.

As apparent from FIG. 8, when the lock cylinder 123 is in the unlocked position as shown, and the spring pin 178 engages flat portion 123a, detent 124 is urged into the bore 112, to engage the rod serrations 120, by the force of the spring pin 178. Because detent 124 is held only by spring 178, the bar 118 can be extended or retracted by applying a relatively small force. When lock cylinder 123 is rotated, however, the spring legs 184 are forced together, and detent 124 is prevented from retracting. This will prevent any movement of the rod 112 in the bore 112.

As shown in FIG. 9, upper housing half 154 is complementary to lower half 152, including mating ridges 158a, 160a and 162a and mating half cylinder guides 164a, 165a, 166a, 168a, and 176a. Upper half 154 also includes an upper boss half 174a for the lock 122, with a hole 174b to expose the lock keyhole. Finally, upper housing member 154 includes a plurality of rivet pegs 186 positioned to be received in holes 172 in the lower housing member 152. A peg 182a may also be provided to fit over pin 182 and spring 178 of the lower member.

If desired, peg 182a may be larger than pin 182 to prevent spring 178 from moving upwardly.

To assemble the embodiment of FIGS. 7-9, bore tube 112 is disposed in the lower guide halves 164, 166, 176, so that cutout 179 faces the lock cylinder 123. Lock 122 is then positioned in the boss 174 and preferably pinned in place, in a manner well known. Therafter, detent 124 and spring 178 are positioned as in FIG. 8, and legs 114 are placed on the guide halves 165, 168 so that pins 150 extends into the holes 115. With the parts thus in place, the upper housing half 154 is positioned over the lower half 152, so that rivet pegs 186 extend through holes 172, and also so that the upper anchor pins 150a extend into the holes 115 in the legs 114, from the opposite side of pins 150.

The rivet pegs 186 are long enough to extend completely through the holes 172, so that when the housing halves 152, 154 are so joined the ends of the rivets 186 can be mechanically flattened to secure the halves together. As described above, preferably the ends of the holes 172, on the exterior side of the housing, are recessed, so that the flattened rivet ends will lie below the housing surface, thereby making them more difficult to remove. Thereafter, the rod 118 can be readily inserted into the bore 112.

As shown in FIG. 2, the device is mounted on a steering wheel 38 by fitting the hooks 30 on the legs 14 about one side of the steering wheel rim. With the rod 18 in a retracted position, the fan shape jaw 32 can be maneuvered into position below the opposite side of the steering wheel 38. Thereafter, rod 18 is extended until the jaw 32 snugly engages the opposite side of the steering 38. The lock bar shown in FIGS. 7-9 is mounted in the same manner.

With the device 50 mounted, and lock 22 locked to prevent retraction of the jaw 32, the bar 18 projects outwardly from the steering wheel 38. If the steering wheel is turned, the bar 18 will hit the roof, or seat, or door. Thus the device effectively prevents the car from being driven.

Because of the converging jaw halves 40, 42, there will be a slight give when the jaw 32 first engages the steering wheel. Thus, if the lock pin 23 is not exactly opposite to a serration groove, the rod can be pushed outwardly until the next serration is engaged. Thus, even though the telescoping rod can be locked only at defined axial positions (as defined by the separation between the serrations), the configuration of the jaw takes up slack and the device can be mounted securely. Moreover, because the device engages the steering wheel at spaced circumferential positions on one side, and by way of a fan shape jaw on the opposite side, unauthorized removal of the device from the steering wheel is very difficult.

The foregoing represents the preferred embodiments according to the invention. Variations and modifications will be apparent to persons skilled in the art, without departing from the inventive concepts disclosed herein. All such modifications and variations are intended to be within the scope of the invention as defined in the following claims.

I claim:

1. A device for securing a vehicle steering wheel comprising:
   a lock housing having an axial bore therethrough;
   a pair of legs rigidly extending from the housing at an acute angle relative to said axis and to one another;
   engagement means of each leg, spaced from said housing, and comprising a U-shaped hook having an opening facing away from said housing for engaging one side of the steering wheel at spaced locations;
   a rod extending axially from said bore in the direction opposite to said legs, said rod being axially moveable in said bore and having a distal end;
   second U-shaped engagement means on said rod having an opening facing said distal end for engaging the opposite side of the steering wheel, said second engagement means being spaced a distance from said distal end; and
   lock means disposed in said housing for locking said rod at selected axial locations.

2. A device for securing a vehicle steering wheel comprising:
   a lock housing having an axial bore therethrough;
   a pair of legs rigidly extending from the housing at an acute angle relative to said axis and to one another;
   engagement means of each leg, spaced from said housing, for engaging one side of the steering wheel at spaced locations;
   a rod extending axially from said bore in the direction opposite to said legs, said rod being axially moveable in said bore and having a distal end;
   second engagement means on said rod having an opening facing said distal end for engaging the opposite side of the steering wheel, said second engagement means being spaced a distance from said distal end and comprising an open outwardly facing jaw having a pair of converging jaw halves connected by a saddle portion having a dimension smaller than a conventional steering wheel rim, whereby said jaw can engage a steering wheel rim with the rim urging said jaw halves apart; and
   lock means disposed in said housing for locking said rod at selected axial locations.

3. A device for securing a vehicle steering wheel comprising:
   a lock housing having an axial bore therethrough;
   a pair of legs rigidly extending from the housing at an acute angle relative to said axis and to one another;
   engagement means of each leg, spaced from said housing, for engaging one side of the steering wheel at spaced locations;
   a rod extending axially from said bore in the direction opposite to said legs, said rod being axially moveable in said bore and having a distal end;
   second engagement means on said rod for engaging the opposite side of the steering wheel, said second engagement means being spaced a distance from said distal end and comprising an open outwardly facing jaw having a pair of fan shaped jaw halves, wherein said jaw halves are connected by a saddle portion having a curvature following the curvature of a conventional steering wheel; and
   lock means disposed in said housing for locking said rod at selected axial locations.

4. A device for securing a vehicle steering wheel comprising:
   a lock housing having an axial bore therethrough;
   a pair of legs extending from the housing at an acute angle relative to said axis and at an angle of approximately 25° relative to one another;
   engagement means of each leg, spaced from said housing, for engaging one side of the steering wheel at spaced locations;

a rod extending axially from said bore in the direction opposite to said legs, said rod being axially moveable in said bore and having a distal end;

second engagement means on said rod for engaging the opposite side of the steering wheel, said second engagement means being spaced a distance from said distal end; and lock means disposed in said housing for locking said rod at selected axial locations.

5. A device for securing a vehicle steering wheel comprising:

a lock housing having an axial bore therethrough;

a pair of legs rigidly extending from the housing at an acute angle relative to said axis and at an angle of approximately 25° relative to one another;

engagement means of each leg, spaced from said housing, for engaging one side of the steering wheel at spaced locations;

a rod extending axially from said bore in the direction opposite to said legs, said rod being axially moveable in said bore and having a distal end;

second engagement means on said rod for engaging the opposite side of the steering wheel, said second engagement means being spaced a distance from said distal end and comprising an open outwardly facing jaw having a pair of jaw halves; and lock means disposed in said housing for locking said rod at selected axial locations.

6. A device according to claim 1, wherein said second engagement means comprises an open, outwardly facing jaw having a pair of jaw halves, wherein said jaw halves are connected by a saddle portion having a curvature following the curvature of a conventional steering wheel.

7. A device according to claim 6 or 2, wherein the jaw halves are fan shaped.

8. A device according to claim 2, wherein the jaw halves are fan shaped and said saddle is curved so as to follow the curvature of a standard steering wheel.

9. A device according to claim 1, 6, 2, 3, or 8 wherein said legs diverge at an angle of approximately 25° relative to one another.

* * * * *

UNITED STATES PATENT AND TRADEMARK OFFICE
CERTIFICATE OF CORRECTION

PATENT NO. : 4,949,561

DATED : August 21, 1990

INVENTOR(S) : Joseph E. Solow, et al.

It is certified that error appears in the above-identified patent and that said Letters Patent is hereby corrected as shown below:

Col. 1, line 62, "positions" should read --position--.
Col. 2, line 4, after "steering" insert --wheel--.
        line 32, "both" should read --lock--.
        line 34, "FIGS." should read --FIG.--.
        line 51, "rotatably" should read --rotatable--.
        line 64, "generally" should read --general--.
Col. 4, line 58, "rod 112" should read --rod 118--.
Col. 5, line 33, after "steering" insert --wheel--.
        line 63, "I Claim" should read --We claim--.
Col. 6, line 1, "of" should read --on--.
        line 21, "of" should --on--.
        line 66, "of" should read --on--.
Col. 7, line 17, "means of" should read --means on--.

Signed and Sealed this

Eleventh Day of February, 1992

Attest:

HARRY F. MANBECK, JR.

*Attesting Officer*      *Commissioner of Patents and Trademarks*